United States Patent
Primos et al.

(10) Patent No.: US 6,210,251 B1
(45) Date of Patent: Apr. 3, 2001

(54) FEATHERED GAME CALL APPARATUS AND METHOD

(75) Inventors: Wilbur R. Primos, Jackson; James A. Primos, Jr., Madison, both of MS (US)

(73) Assignee: Primos, Inc., Jackson, MS (US)

( * ) Notice: Subject to any disclaimer, the term of this patent is extended or adjusted under 35 U.S.C. 154(b) by 0 days.

(21) Appl. No.: 09/206,124

(22) Filed: Dec. 5, 1998

(51) Int. Cl.⁷ ..................................... A63H 5/00
(52) U.S. Cl. ......................... 446/397; 446/418; 446/207
(58) Field of Search .................... 446/397, 418, 446/421, 207, 208, 209; 43/1; 428/6, 16; 15/234; D32/46; 439/441

(56) References Cited

U.S. PATENT DOCUMENTS

| | | | | |
|---|---|---|---|---|
| 2,443,430 | * | 6/1948 | Nigro | 15/234 |
| 2,679,711 | * | 6/1954 | Learnard | 446/27 |
| 5,064,725 | * | 11/1991 | Acker | 428/16 |
| 5,437,935 | * | 8/1995 | Fredeen | 428/16 |

FOREIGN PATENT DOCUMENTS

2204748 * 11/1988 (GB) ..................................... 439/441

* cited by examiner

Primary Examiner—Sam Rimell
(74) Attorney, Agent, or Firm—Foster & Foster

(57) ABSTRACT

A feathered game call apparatus that simulates the wing sounds of a game bird. One preferred game call comprises an array of feathers and a handle having a gripping portion for manually manipulating the call and a feather-receiving area. The array of feathers is sequentially grouped and nested closely together so as to resemble an actual wing of a game bird. Each feather comprises a stem end and a tip end. The feathers are arranged generally in a spaced relationship in a common plane. The stems converge toward a common point of intersection at the handle, and diverge outwardly away from the handle to form a plurality of acute angles with respect to each other. The feathers are flared outwardly in a cantilevered, sequential, fan-shaped, nested fashion from the handle. An end feather may be turned inwardly to simulate the make-up of an actual wing of a game bird. Each stem-receiving area may comprise one or more feather retainers comprising a type of structure which may engage, pierce, or penetrate the associated stem. The invention may also comprise a transverse wall segment compression retainer which compressively engages the stem and holds the stem to prevent inadvertent separation and undesired rotation of the feather relative to the handle. One preferred handle comprises two clam shell pieces releasably fastened together.

6 Claims, 6 Drawing Sheets

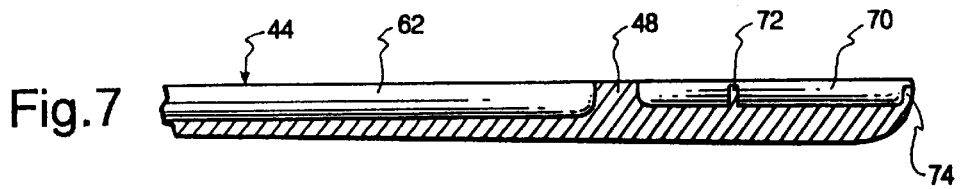
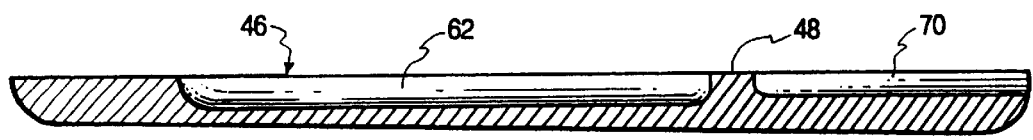
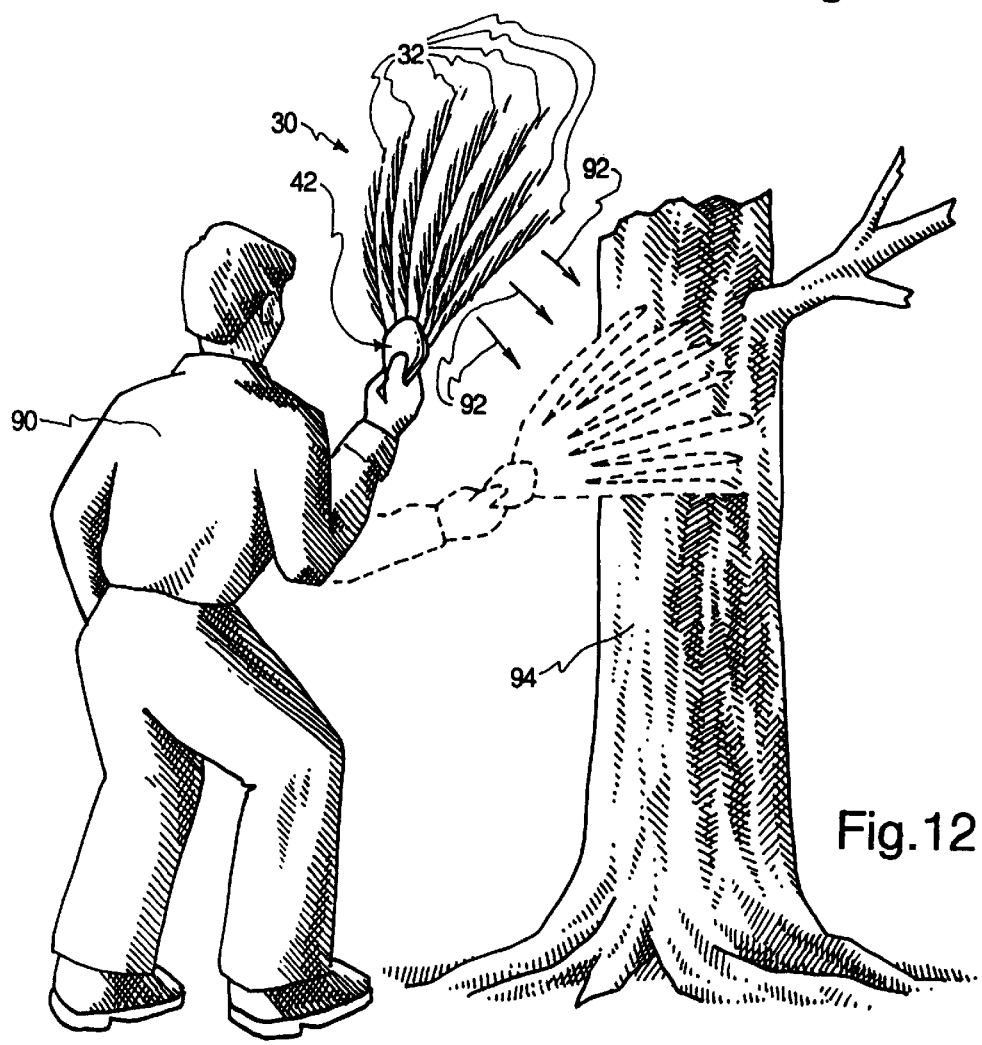

FEATHERED GAME CALL APPARATUS AND METHOD

TECHNICAL FIELD

The present invention relates generally to game calls and more particularly to calls for game birds and related methods, each call being similar to the actual wing of a game bird and which substantially replicates, during use, the sound of a flapping wing of a game bird.

BACKGROUND OF THE INVENTION

Various types of game calls and game attractants have existed over the years. The main purpose of a game call is to simulate the sound of the game being pursued by the hunter. Perhaps the largest number of traditional game calls attempt to simulate the vocal sounds of the game animal or bird being pursued. Such vocal simulating game calls come in many different types and styles.

Another traditional type of game calls relate to devices that simulate other sounds made by game animals, such as the rattling of antlers. Actual antlers are sometimes used. In addition, synthetic antlers have been used to simulate the sounds of two animals sparring with their horns or antlers.

Still many other types of game calls have existed. Hunters have attempted to simulate, for example, the urination of a moose in a body of water by emptying a vessel of water into a lake or other body of water. Visual decoys of many different varieties have been utilized in the past. Olfactory attractants have been utilized to simulate the smells of animals. All of these devices have the effect of attracting game animals or game birds.

There remains a need, however, to develop additional ways of attracting game birds, particularly wild turkeys. Wild turkeys perform numerous rituals during the breeding season. As the game birds perform their rituals, they tend to make noises with their wings, such as by flapping their wings against the ground, branches, tree trunks, and other foliage in the surrounding area. Game birds may also use their wings to scratch in the leaves while feeding. These sounds tend to attract other similar game birds.

There remains a need, therefore, to provide a device that simulates the sounds of a game bird, particularly the wing sounds of a game birds. As with all game calls, such a device must be portable, easy to use, and effective for attracting game birds.

A difficulty with respect to the concept of providing a device for simulating the wing sounds of a game bird relates to the actual assembly of such a device. If actual feathers are to be utilized, there must be an effective method to arrange and secure the feathers in the device so that the device can be utilized effectively to simulate the wing sounds of a game bird.

SUMMARY AND OBJECTS OF THE INVENTION

The foregoing deficiencies of traditional game calls are overcome by a feathered game call apparatus according to the present invention. The feathered game call comprises an array of feathers arranged in a manner similar to those of an actual game bird. The feathered game call further comprises a handle having a gripping portion for manually manipulating the call and a feather-receiving portion. The array of feathers is grouped closely together so as to resemble an actual wing of a game bird. Each feather comprises a stem end and a tip end. The feathers are preferably arranged in a side-by-side manner. Each stem forms an acute angle with respect to an adjacent stem so that the feathers are flared outwardly in a cantilevered, fan-shaped fashion and extend from one side of the handle. The orientation of the small end feather may be turned inwardly in respect to the other feathers to capture more air under the wing and better replicate actual wing sounds of a game bird.

In a preferred embodiment, each stem is placed and retained in a recess or blind bore. Each stem-retaining site may comprise a feather stem retainer in the form of one or more spikes which may pierce or penetrate the associated stem. Alternatively, the stem-retaining site may include a feather stem retainer in the form of a transverse wall segment which compressively bites against the stem. In either preferred embodiment, the feather stem retainers prevent inadvertent separation of feathers from the handle and rotational movement of the feathers relative to the handle. The retainers also serve to maintain proper alignment of the feathers during the assembly or manufacturing process. The handle may comprise two clam shell pieces releasably fastened together. The invention may further comprise still other structures to prevent movement of the feathers relative to the handle portion.

The invention also comprises novel methods of making and using the feathered game call apparatus embodying principles of the present invention.

With the foregoing in mind, it is a primary object to provide a novel game call which overcomes or alleviates problems of traditional game calls.

It is another object to provide a game call which is substantially similar to an actual wing of a game bird.

A further object is the provision of a game call which simulates the noise made by the flapping of a wing of an actual game bird.

Another object is the provision of a game call comprising an array of feathers and a handle by which the call is manually gripped and manipulated.

Still another object is the provision of a game bird wing-simulating game call comprised of a handle and an array of feathers.

Yet another object of this invention is the provision of a feathered game call apparatus comprising a multiple piece clam shell handle and a fan-shaped array of sequential nested feathers where the handle comprises a gripping portion and a feather-receiving and securing portion.

Another object is the provision of a game call comprised of an array of feathers, the stems of which are securely connected to a handle at spaced feather-receiving and retaining sites.

A further object is the provision of a game bird wing-simulating game call comprising a flared array of nested feathers secured seriatim in feather stem-receiving sites located along one side of a gripping handle.

An additional object is the provision of a turkey wing game call comprising a feature which substantially prevents feather rotation in respect to a feather-receiving site in a handle.

Another object of the present invention is to provide a feathered game call apparatus that has the appearance of an actual turkey wing.

Still another object of the present invention is to provide a feathered game call apparatus that is constructed so as to arrange the feathers in a manner highly similar to that of an actual wing of a game bird.

Yet another object of the invention is to provide a feathered game call apparatus that arranges a plurality of feathers in an array so as to provide a tight construction so that the feathers are grouped closely together to push a substantial volume of air when a flapping motion is simulated.

Another object of the present invention is to provide a feathered game call apparatus that can be cost effectively mass produced.

These and other objects and features of the present invention will become more apparent from the detailed description of the invention that follows taken with reference to the accompanying drawings.

BRIEF DESCRIPTION OF THE DRAWINGS

FIG. 7 is a fragmentary cross sectional view taken along line 7—7 of FIG. 5;

FIG. 8 is a cross sectional view taken along line 8—8 of FIG. 6;

FIG. 12 is a perspective view of one manner in which a simulated game bird wing device according to the present invention may be used to call to other game birds, for example, during a game bird hunting season;

DETAILED DESCRIPTION OF THE INVENTION

The present invention may relate to all types of game birds. For example, without limitation, the feathered game call apparatus may replicate the wing construction of turkeys, pheasants, chukars, grouse, partridge, water fowl, or any other type of game bird. With respect to the detailed description of the invention set forth below, a turkey wing is specifically discussed in addressing preferred embodiments of the present invention. It is to be understood, however, that the invention may be suitable for other types of game birds without limitation.

Figure 1:
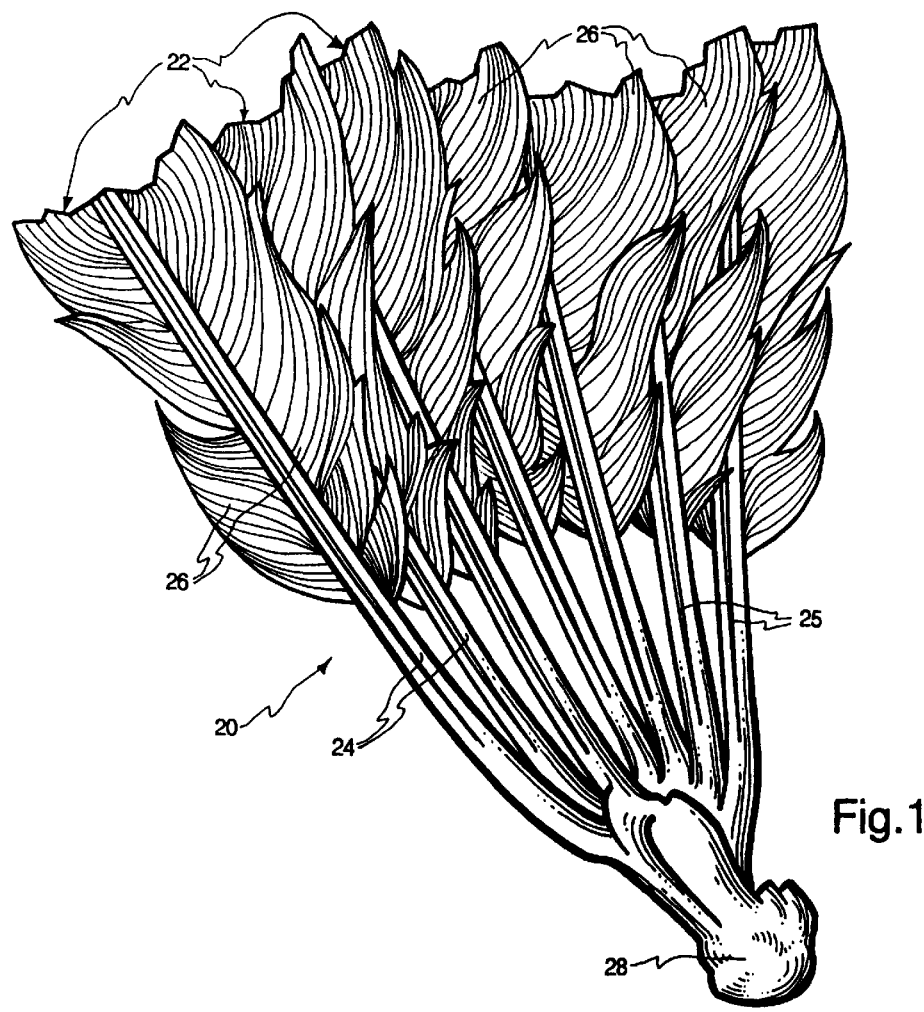
FIG. 1 is a fragmentary perspective view of an actual turkey wing.

In referring to the drawings, like numerals are used to designate like parts throughout the detailed description. FIG. 1 illustrates, in fragmentary perspective, an actual turkey wing, generally designated 20, comprised of a plurality of feathers 22. Each feather comprises a shaft, stem, or quill 24 and side band sprouts, ribbons, vanes, fins, or branches 26. The feather stems 24 integrally join at a wing socket bone 28. Each stem 24 has a naturally occurring bottom side 25, which is generally flat but includes a slight V-shaped indentation. The opposite side of the stem is rounded. Normally, an actual turkey wing comprises a small end feather which is turned in its orientation inwardly in respect to the nested parallel orientation of the other feathers.

A significant difficulty in replicating the configuration of an actual turkey wing relates to the manner in which the feathers of an actual turkey wing extend radially outwardly. As shown in FIG. 1, the feathers converge toward the wing socket bone area 28 which comprises generally an enlarged, bulbous end. In producing a suitable feathered game call apparatus, there is a significant challenge associated with arranging an array of feathers so as to extend radially outwardly and simulate the appearance of an actual turkey wing. In designing a feathered game call apparatus, it would be preferable to eliminate the bulbous end and secure the feathers in a device that can be easily grasped and manipulated. Nevertheless, the feathers must be arranged in a manner that simulates the actual arrangement of feathers on an actual turkey wing to provide a function, sound, and appearance that can simulate sounds of an actual turkey wing.

Figure 2:
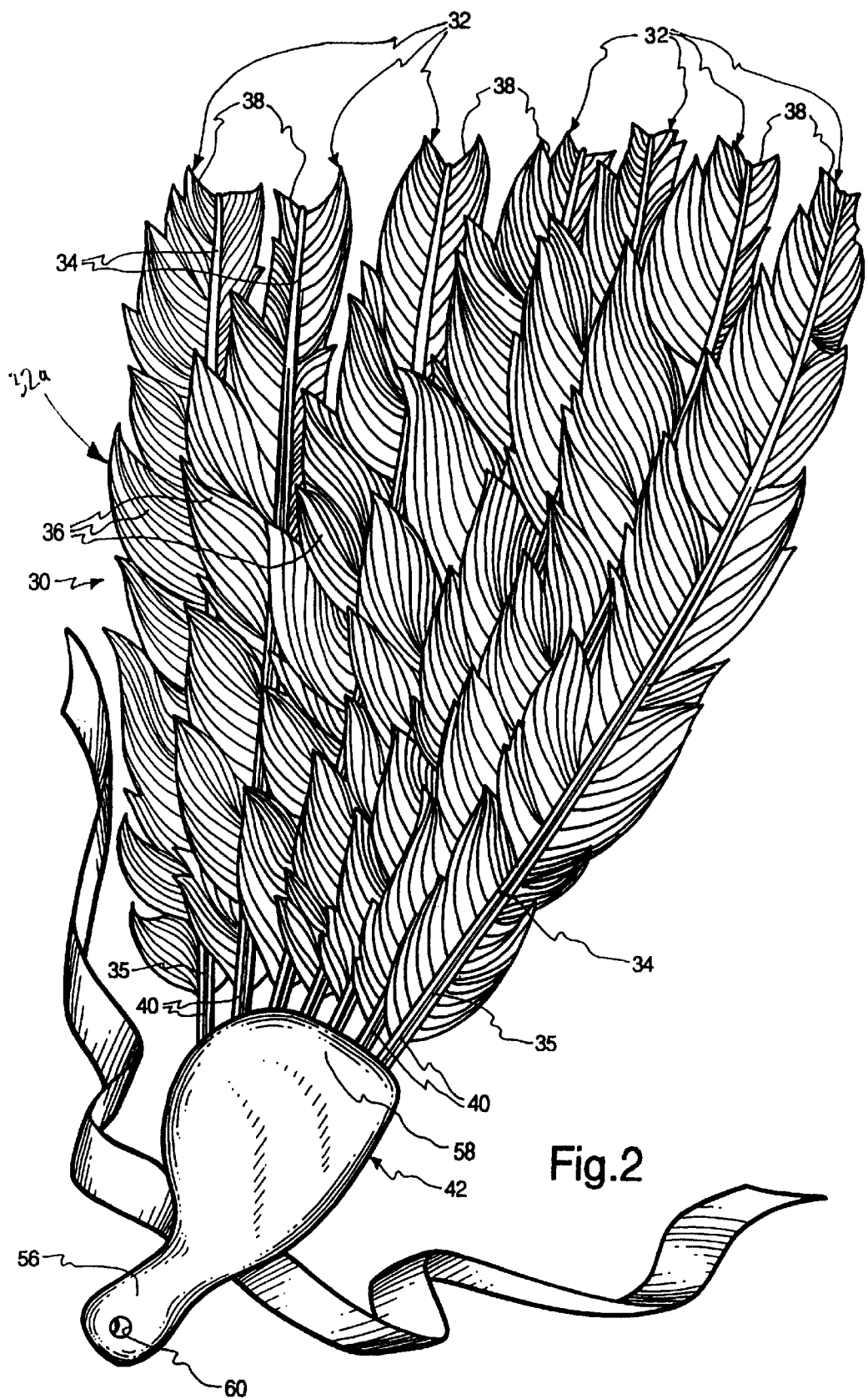
FIGS. 2 and 3 are respectively front and rear perspective views of a feathered game call apparatus comprising a handle and a fan-shaped array of feathers according to the present invention.
Figure 3:
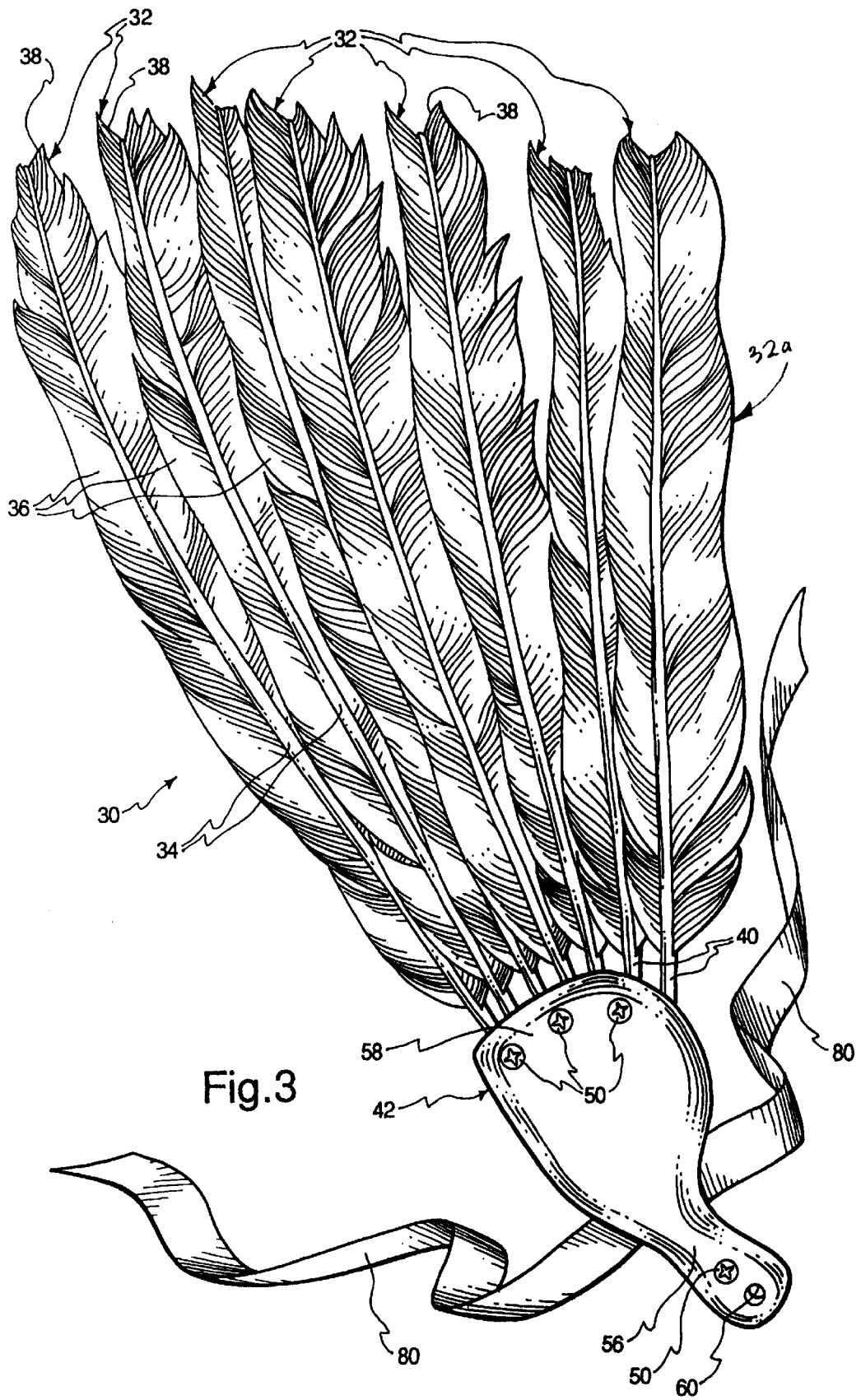

One embodiment of a feathered game call apparatus, generally designated 30, according to the present invention is illustrated in FIGS. 2 and 3. The simulated turkey wing 30 comprises a fan-shaped array of nested feathers 32. Each feather comprises a shaft, stem, or quill 34 and side band sprouts, ribbons, vanes, fins, or branches 36. The feathers 32 are preferably actual turkey wing feathers. As such, each stem 34 has a longitudinally extending indentation 35 on the underside of the stem. While it is presently preferred that durable actual turkey feathers be used for each feather of the array 32, other types of natural bird feathers may be used appropriately or, in the alternative, feathers comprised of synthetic materials may be used. As is readily apparent from FIGS. 2 and 3, the array 32 of the feathers is fan-shaped, with each feather facially flared or divergent from the other feathers so that the feathers are sequentially nested and at an acute angle relative to each other as they extend from the handle. The feathers are arranged in nested relationship with some vane overlap. Each feather comprises a distal tip 3 8 and a proximal unencumbered or exposed stem end 40. The distal tips 38 may be cut as necessary (such as may be necessary for packaging) or as desired.

The stem or quill ends 40 are free of feather vanes and extend into and are held firmly by a holder or handle, generally designated 42, in a cantilevered manner. The handle 42 holds the feathers to prevent inadvertent separation or rotation of any feather from the handle 42 during use or storage.

Figure 4:
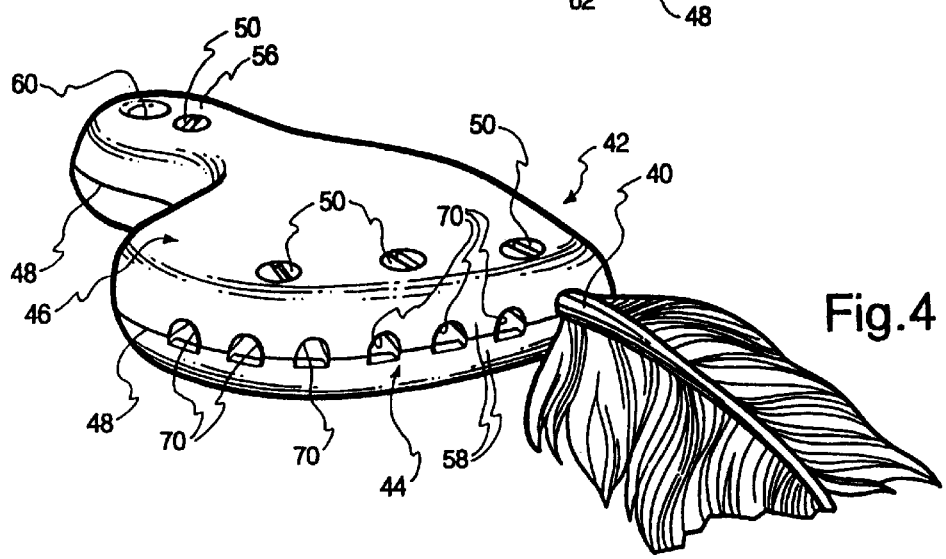
FIG. 4 is a perspective view of a two-piece game call handle showing the stem of one feather clamped in a stem-receiving recess or cavity.
Figure 14:
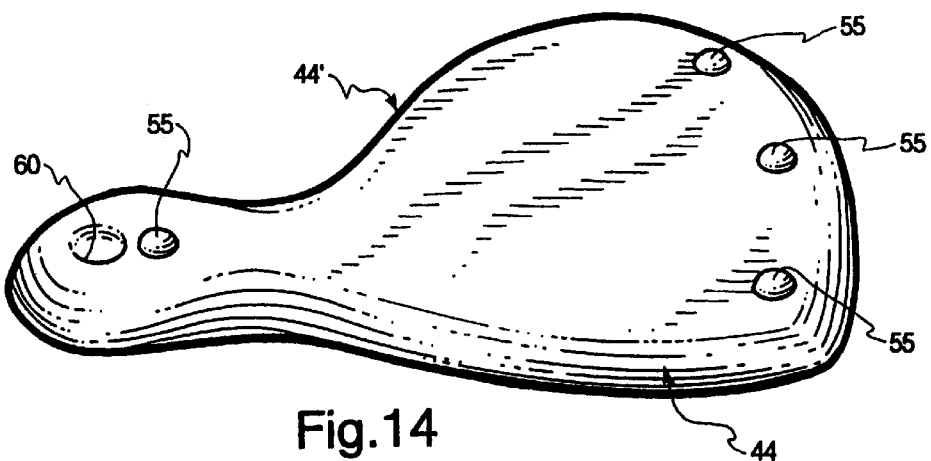
FIG. 14 is a perspective view of the outside of another handle half comprised of thickened regions adjacent fastener-receiving blind bores.

As can be seen in FIGS. 2 and 3, the array of feathers is fan-shaped, similar to an actual turkey wing. While the handle 42 may be of any suitable type which anchors the proximal stem ends 40 into essentially the position illustrated in FIGS. 2 and 3, handle 42 preferably comprises two flat pieces or parts 44 and 46 (FIG. 4). Handle pieces 44 and 46 are illustrated as defining a central parting plane 48 between the two when assembled and fastened together. The handle pieces 44 and 46 are preferably formed of a molded synthetic resinous material which is shape-retaining and durable. Injection molding of parts 44 and 46 is preferred. The two clam shell handle pieces 44 and 46, in the assembled position as illustrated, are preferably held together by four screw fasteners 50, each of which pass through a counter sunk aperture 52 (FIG. 5) and are threaded into blind bores 54 (FIG. 6) of handle half 44 so the head of each screw does not project above the exterior surface of the handle. As shown in FIG. 14, the wall of handle halves 44 may be thickened at protrusions 55 to prevent penetration of the associated screw fastener 50 through the base call of handle part 44. The protrusions 55 allow the handle portion 42 to remain slender and sleek, and thus easy to grasp and manipulate. The exterior surface of each handle piece 44 and 46 is smooth with rounded edges. Bores 54 may be initially threaded or diametrally sized so as to become threaded when a screw 50 is forcibly advanced into a bore 54.

The handle, in the assembled condition, comprises a relatively narrow and thin manual gripping portion or end 56 and a feather-receiving portion or side 58. The gripping portion 56 is intended to be manually grasped by the user for the purpose of manipulating the array 32 of feathers in order to create turkey wing-simulating noises for the purpose of attracting wild turkeys. The manual grasping portion 56 comprises, in the assembled condition, aligned bores or apertures 60 through both pieces 44 and 46 for receipt of a lanyard (not shown). It is to be understood that a preferred way of carrying the feathered game call apparatus is to place the device in the back of the hunter's vest.

Figure 5:
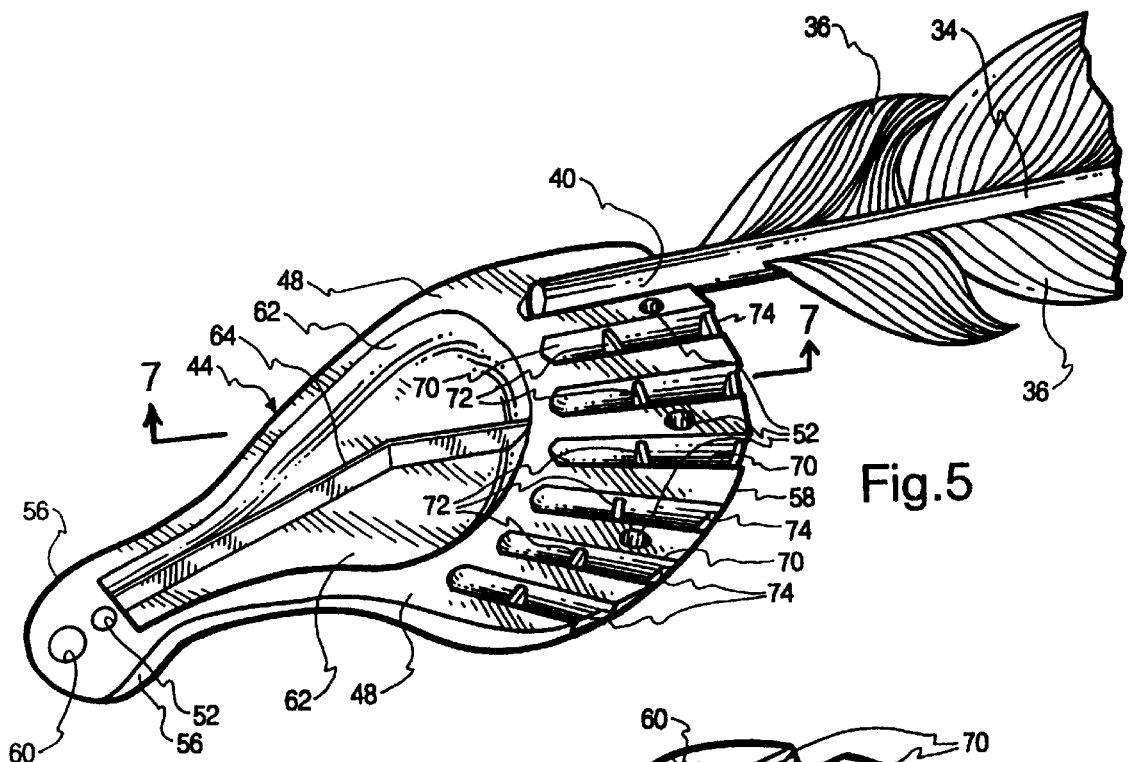
FIG. 5 is a perspective view of the inside portion of the lower piece of the handle of FIG. 4.
Figure 6:
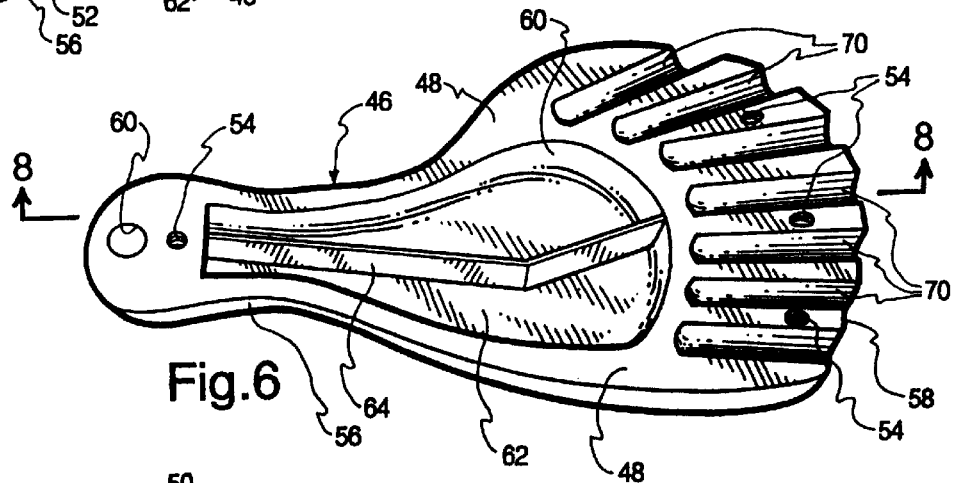
FIG. 6 is a perspective view of the inside portion of the upper piece of the handle of FIG. 4.

As illustrated in FIG. 5 and 6, the two surfaces defining the parting plane 48 are interrupted by respective recesses 62 in the form of aligned top and bottom cavities. The recesses serve to reduce the weight of the feathered game call and minimize the material required to manufacture the handle portion. Each of the top and bottom portions of recess 62 have a reinforcing bar or blade 64, of angular configuration, extending centrally along the length of the cavity 62. Each bar 64 is preferably plastic, and is molded as a single piece with the bottom and top pieces 44 and 46, respectively, of the handle 42. The top and bottom segments of the cavity 62 are generally of a keyhole-type configuration. The bars or blades 64 further serve to promote proper solidification and prevent warping of handle pieces 44 and 46 after the molding process is completed so that the handle parts remain true and, therefore, contiguously mesh in planar relation at parting plane 48.

Figure 9:
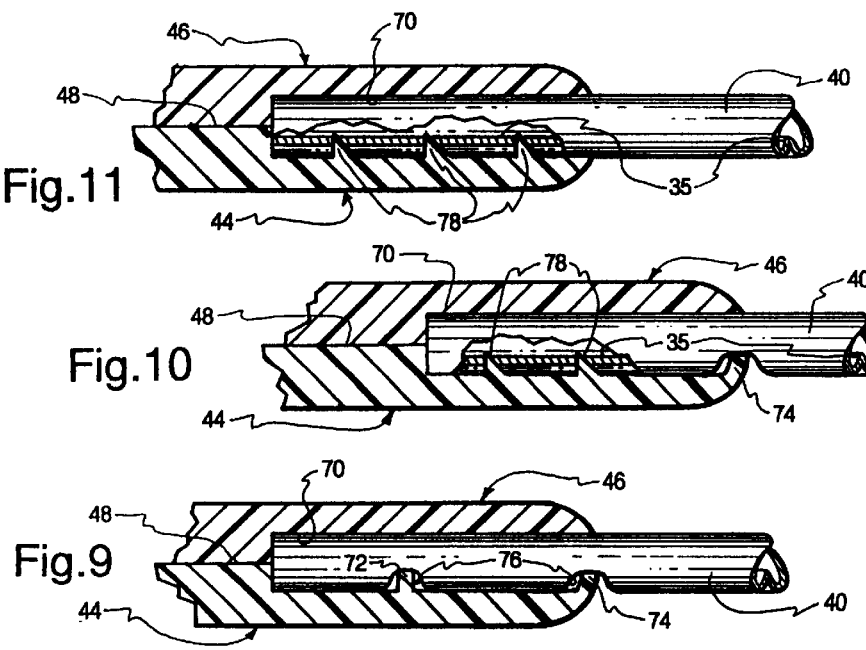
FIG. 9 is a cross sectional view of the stem of a feather being held to prevent undesired removal between two handle pieces by compression feather retainers.

With reference to FIGS. 4 through 6, the feather-receiving portion 58 of the handle 42 comprises a series of closely spaced feather-receiving recesses or blind bores 70 formed in the bottom and top flat handle pieces 44 and 46. The recesses 70 in both the bottom and the top handle pieces 44 and 46 are semi-cylindrical in their configuration, and are sized, located, and shaped to match and be aligned with each other so that each top and bottom aligned semi-cylindrical recesses form collectively a cylindrical recess when the handle pieces 44 and 46 are assembled, as shown in FIG. 4. Each collective blind bore recess (formed of two semi-cylindrical recesses 70) is sized to receive the proximal end 40 of a feather stem and prevent inadvertent separation or rotation of the feather relative to the handle. When assembled, therefore, a proximal stem end 40 of each feather is contained within the matching and aligned semi-cylindrical recesses 70, one above the other which, when taken together, form the above mentioned collective cylindrical recesses. As is noted from FIG. 6, the semi-cylindrical recesses 70 in the handle piece 46 are uninterrupted. The feather indentations 35 face the handle piece 44. In the embodiment of FIGS. 4–6, the semi-cylindrical recesses 70 of the handle piece 44 (FIG. 5) are centrally interrupted by two transversely-directed interior and end abutment plates or compression retainers 72 and 74. Abutment plates 72 and 74 are integrally formed when the piece 44 is molded and comprise feather-compression sites or retainers which function to compressively bite the proximal end 40 of the associated feather stem at the indentation 35 in the manner illustrated in FIG. 9. In other words, the spaced transverse abutment plates 72 and 74 forcibly create depressions 76 in the associated stem ends 40 at the indentations formed on the underside 35 of the stems to constrain the stems and prevent inadvertent removal and rotation.

Figure 11:
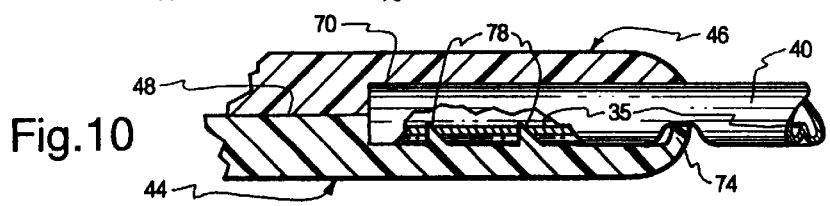
FIG. 11 is a cross sectional view of the stem of a feather held to prevent undesired removal between two handle pieces by feather retainers in the form of feather piercing spikes.
Figure 10:
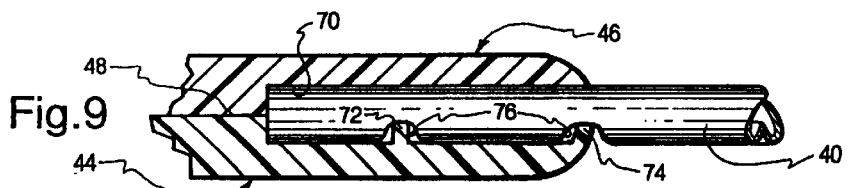
FIG. 10 is a cross sectional view of the stem of a feather held against undesired removal between two handle pieces by two piercing spikes and one compression abutment.

The present invention contemplates utilization of any type of feather retaining structure or feather retainer in recesses 70, to prevent the associated proximal end 40 of the feather stem from being removed or rotated. For example, in the embodiment of FIG. 10, one or more free-standing spikes 78 extend upwardly from the lowest part of recess 70. The spikes 78 can be used alone or in conjunction with one or more compression retainer walls 72 or 74. Note that the central spikes 78 in FIG. 10 are illustrated as puncturing, penetrating, or piercing through the wall of the associated stem end 40 at the indentation 35, while the abutment plate or compression bite retainer 74 compresses or bites or binds against the wall of the stem end 40 adjacent the indentation 35. Also, spikes 78 alone may be used to retain the feathers in the handle in the manner illustrated in FIG. 11 (three spikes are illustrated). The retainers 74 and 78 also prevent stem rotation. Thus, the feather-receiving sites in the handle allow forcible manipulation of the array 32 of feathers via the handle 42 without the risk that one or more feathers will separate from the handle during use. Also, interior transverse rectangular compression retainers 75 (FIG. 13) having a smaller vertical profile than retainers 74, may be used as may be free-standing centrally-located block retainers 77. Each retainer 77 comprises a broad flat tip 79 and is located at the center of the entrance to the semi-cylinder recess segment 70. Each block-shaped retainer 77 is shown as compressively biting the adjacent feather indentation 35, but could be sized and shaped to pierce the wall of the associated stem end 40. The retainers 74, 77 also serve to keep the feathers in the proper alignment during the assembly process of the feathered game call.

Figure 13:
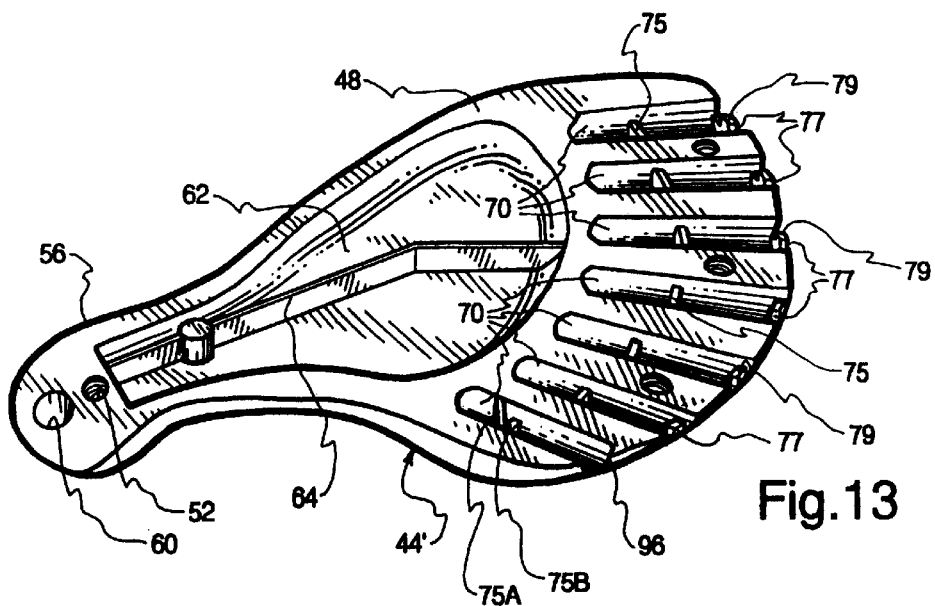
FIG. 13 is a perspective view of the inside of another handle half comprising compression retainers to engage stems of feathers, some of which have depth and others comprising a block shape with a flat broad tip.
Figure 15:
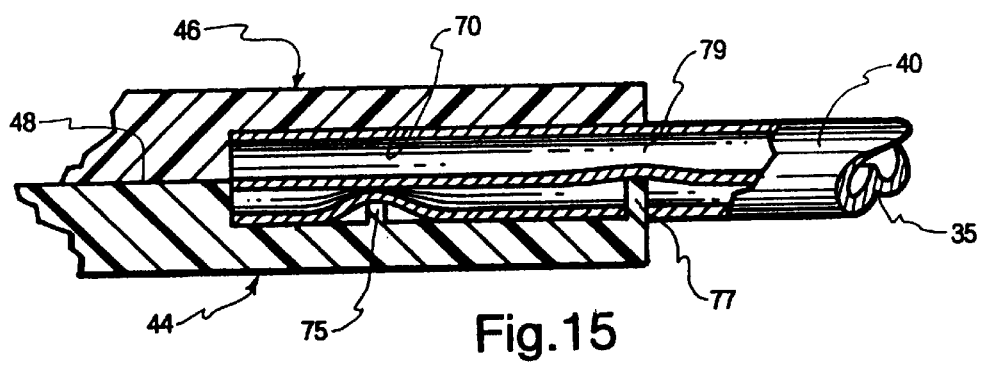
FIG. 15 is an enlarged fragmentary cross sectional view of two assembled handle halves comprising a feather stem-receiving blind bore having the compression retainer shown in FIG. 13.

As shown in FIG. 13, to accurately mimic an actual turkey wing, it may be desirable to turn or orient the short end feather 32a (FIGS. 2 and 3) slightly inwardly in a non-parallel orientation relative to the other feathers (which generally have a parallel orientation with each other). The orientation of each feather is at an acute angle to the parting plane 48 between the two handle pieces 44 and 46. To so turn the short end feather inwardly, the handle piece 44 of FIG. 13 comprises a pointed alignment blade 96 adjacent the entrance to the last recess 70. The tip of blade 96 is intended to seat inside the indentation on the underside of the stem of the end feather. This causes the end feather to roll or rotate inwardly toward the other feathers. In addition, retainer 75A is angled (as compared to the other retainers 75) and sloped downwardly to terminate at approximately the midpoint of the bottom surface of bore 70. Angled retainer 75A has a higher profile than smaller, transversely oriented bar 75B. Thus, retainer 75A engages the end feather stem. The combination of retainer 75A and blade 96 maintains the end feather turned or oriented inwardly in respect to the other feathers when the game call is assembled. This allows the array of feathers to capture a significant volume of air when manipulated in a flapping manner to better simulate actual wing sounds of game birds. The retainer 75A and the blade 96 farther serve to prevent separation of the end feather from the handle and rotation of the end feather relative to the handle after assembly.

For potential safety benefits, a ribbon 80 may optionally be placed between the two clamping handle halves 44 and 46 at parting plane 48 during handle assembly and held tightly in place when screws 50 are tightened so that the ribbon 80 extends on opposite sides of the handle as illustrated in FIGS. 2 and 3. By making the ribbon 80 of a bright color, such as florescent orange, other hunters may potentially be warned that movement of the simulated turkey wing game call 30 by its user is not the activity of a live turkey.

From the foregoing it is clear that the present invention encompasses a method of making a turkey call wherein the stems of each feather of an array of spaced nested feathers are placed at their stem ends within an array of stem-receiving and retaining sites and are securely clamped in this position by assembling the two flat handle clamping pieces to thereby replicate a fan-shaped wing of a turkey. The retainers 75 and end block retainers 77 serve to maintain alignment of the feathers during assembly. The retainers 75 and end block retainers 77 are intended to engage bottom surfaces, specifically slight V-shaped indentations, of the stems of the feathers to ensure proper orientation.

In use, as depicted in FIG. 12, the user 90 grasps, at gripping location 56, the handle 42 and rapidly moves the array 32 feathers of the device 30 in a flapping manner from the solid line position to the dotted line position of FIG. 12 in the direction of arrows 92. Alternative movement of the cantilevered feathers rapidly through the air in a flapping manner may cause a desired swishing noise. To the extent desired, the apparatus can be manipulated to strike an object, such as tree 94 (or branches, leaves, etc.), to create a thumping sound, or raked along the ground, to replicate sounds of an actual turkey making wing-caused noises.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications with the proper scope of the appended claims appropriately interpreted in accordance with the doctrine of equivalents.

We claim:

1. A method of manufacturing a call for game birds comprising:

providing a plurality of feathers;

providing a clamping device having individual feather receiving areas, each feather receiving area having a structural retainer integrally coupled to the respective feather receiving area;

securing the plurality of feathers in the clamping device by engaging the feathers with the structural retainers, the feathers being arranged in a sequential relationship to form an array of feathers, the feathers being held within the feather receiving areas to replicate a fan-shaped wing of a game bird.

2. A feathered game call apparatus, comprising:

a handle portion having a plurality of bores, each bore having a length;

a plurality of feathers, each feather comprising a stem, each stem being secured within one of the plurality of bores in the handle portion;

a plurality of structural retainers integrally coupled to the bores, at least one of the plurality of structural retainers being disposed inside each of the plurality of bores, the structural retainers obstructing at least a portion of the bores and engaging the feather stems to prevent the feathers from moving relative to the respective bores.

3. A feathered game call apparatus according to claim 2 wherein each of the bores comprises a substantial length, the substantial length comprising greater than 50% the bore length, the bores being devoid of structure along their respective substantial lengths.

4. A feathered game call apparatus according to claim 2 wherein the bores are devoid of structure other than the structural retainers.

5. A feathered game call apparatus according to claim 2 wherein the structural retainers comprise transverse compression retainers.

6. A feathered game call apparatus according to claim 2 wherein each bore comprises two structural retainers, each structural retainer comprising a transverse compression retainer.

* * * * *